United States Patent [19]

Lemelson

[11] 4,215,379
[45] Jul. 29, 1980

[54] CARTRIDGE MAGNETIC RECORDER

[76] Inventor: Jerome H. Lemelson, 85 Rector St., Metuchen, N.J. 08840

[21] Appl. No.: 860,685

[22] Filed: Dec. 15, 1977

[51] Int. Cl.² .......................................... G11B 15/66
[52] U.S. Cl. .................................................. 360/85
[58] Field of Search ........................................ 360/85

[56] References Cited

U.S. PATENT DOCUMENTS

| 3,654,400 | 4/1972 | Dickens et al. | 360/85 |
| 3,860,960 | 1/1975 | Akamine | 360/85 |
| 4,012,787 | 3/1977 | Van Slageren | 360/85 |

*Primary Examiner*—Robert S. Tupper

[57] ABSTRACT

A magnetic recording and reproduction apparatus is provided wherein the recording medium is a magnetic tape supported within a cartridge or magazine which is removably attachable to the apparatus. Transducing with respect to the tape of the cartridge is effected by a mechanism which automatically removes a portion of the tape from the cartridge and causes the tape to conform to a portion of the cylindrical surface of a drum containing magnetic transducers. As the drum rotates, the transducers scan transverse tracks of the tape in performing either a recording operation or reproduction operation. At the end of a transducing operation, components of the mechanism retract out of the way of the tape and the tape is driven back into the magazine or cartridge by automatically operating drive means for a reel onto which the tape is wound.

9 Claims, 7 Drawing Figures

CARTRIDGE MAGNETIC RECORDER

SUMMARY OF THE INVENTION

This invention relates to a magnetic recording and reproduction apparatus employing magnetic tape which is supported within a housing defining a magazine or cartridge, sometimes referred to as a cassette. Supply and take-up reels are rotatably supported within the housing of the magazine and guide means is provided for guiding a free length of the tape between the supply and take-up reels, adjacent an opening in the magazine housing. When the magazine is disposed on the housing for the recorder, tape engaging devices supported by pivotable arms engage the tape and draw it out of an opening in the magazine housing to the immediate vicinity of a rotating drum after which a retracted tape engaging device is projected upwardly through an opening in the supporting wall of the recorder against the rear face of the tape and compressing the tape against a length of the cylinder to cylindrically shape the tape and make it conform to the surface of the cylinder in the longitudinal direction. In such attitude, the tape may be longitudinally driven lengthwise of the cylinder as the cylinder rotates and magnetic transducing heads supported by the cylinder may operate to transversely scan a substantial portion of the width of the tape each time a head comes into engagement with the tape and thereby to effect recordings along the transverse tracks of the tape.

The conventional magnetic tape cartridge recorder involves a substantially complex mechanism which must operate, not only to withdraw a loop of tape from the tape cartridge but also to helically wind such tape around a cylinder containing magnetic heads for transducing with respect to the tape while the cylinder and the heads rotate and the tape is helically driven around the cylinder. Such mechanism is relatively complex in structure and in operation.

The instant invention provides a magnetic recording apparatus including a rotating array of magnetic heads for transversely scanning a magnetic tape as it is driven longitudinally past a rotating cylinder supporting the magnetic heads. The mechanism includes means for drawing a tape out of a container or magazine and properly disposing it in engagement with the cylindrical support for the magnetic heads. Such mechanism is relatively uncomplex both in structure and operation.

Accordingly, a primary object of this invention is to provide a new and improved apparatus and method for effecting magnetic transducing operations with respect to a magnetic tape supported within a magazine.

Another object is to provide a magnetic transducing apparatus which is operable to effect transverse scanning of a magnetic tape without the need for helically winding the tape around a transducer supporting cylinder.

Another object is to provide a new and improved apparatus and method for effecting transverse scanning of a magnetic tape at relatively high scanning speed, wherein the tape is fed from and back into a container or cartridge.

With the above and such other objects in view as may hereafter more fully appear, the invention consists of the novel methods, constructions and arrangements of parts as will be more fully described and illustrated in the accompanying drawings, but it is to be understood that changes, variations and modifications may be resorted to which fall within the scope of the invention as claimed.

Figure 1:
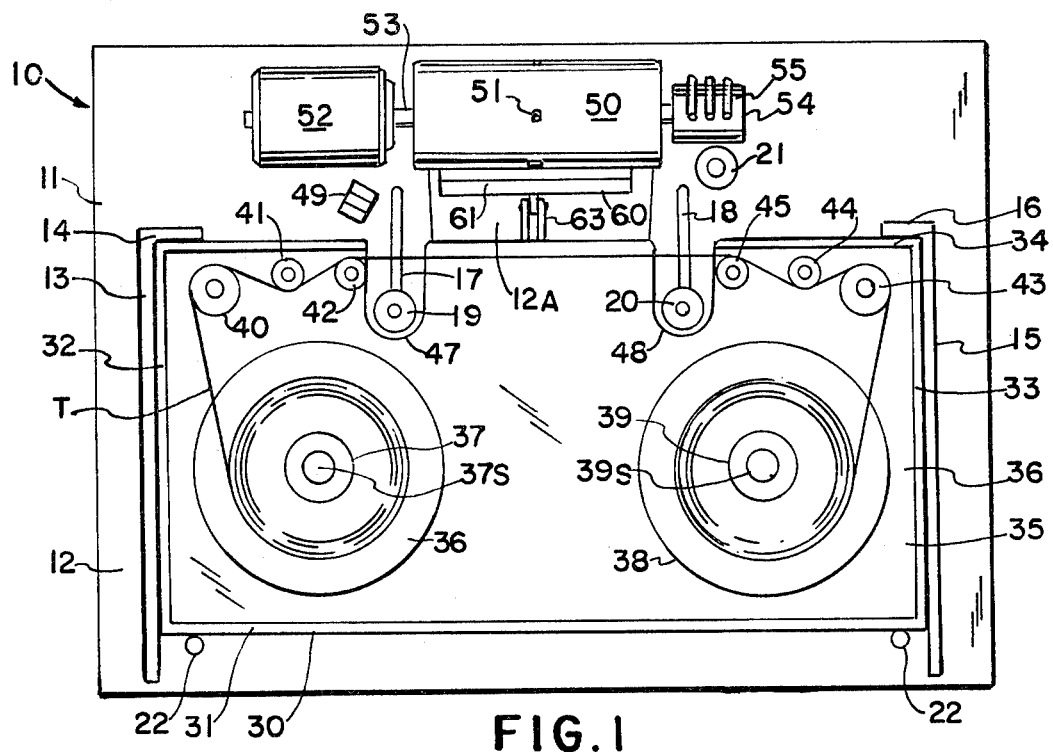
FIG. 1 is a top view of a magnetic recording apparatus and a magazine or cartridge containing magnetic tape prepositioned thereon.

FIGS. 1-4 show details of a first form of the invention comprising a magnetic recording apparatus capable of transducing video picture signals with respect to magnetic tape T supported in a magazine or cartridge 30, commonly known as a cassette. The apparatus 10 includes a support or housing 11 having a top wall 12 with a receptacle portion defined by two L-shaped formations 13 and 15, which together with spring loaded pins 22 project upwardly a brief distance against the upper surface of the top wall 12, predeterminately locates and holds the cartridge 30 fixed with respect to a cylindrical support or drum 50 containing a number of magnetic transducers 51 which rotate when the drum 50 is rotated by a constant speed motor 52 supported above the top wall 12.

Figure 2:
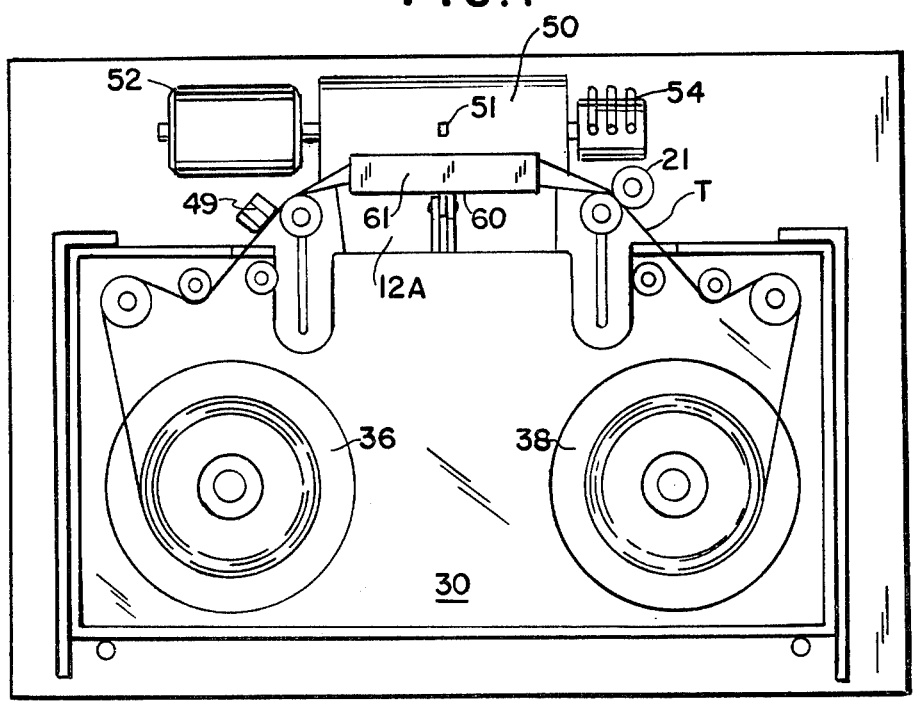
FIG. 2 is a plan view of the apparatus and magazine of FIG. 1 with the magnetic tape of the magazine drawn against and into operative relation with a rotatable drum supporting a magnetic recording transducer.

In FIG. 1, the cassette or cartridge 30 is defined by a housing having a rear edge wall 31, side edge walls 32 and 33, a front wall 34 and major side walls 35 and 36 which, in the embodiments illustrated in FIGS. 1 and 2, is molded of a transparent plastic material permitting the components supported within the housing to be viewed.

When the magnetic tape magazine 30 is in the position illustrated in FIG. 1 prior to transducing, tape T thereof is drawn, as illustrated, between a supply reel 36 and a take-up reel 38, each of which is respectively supported on hubs 37 and 39 which extend through either or both side walls of the magazine, are rotatably supported thereby, and define coupling means in which respective drive shafts 37S and 39S are inserted for driving the reels, either as a result of aligning the housing of the magazine 30 directly above the location illustrated and dropping it onto the upper surface of top wall 12 to permit protruding end portions of the shaft 37S and 39S to be inserted into the openings in the reel hubs 37 and 39 or by manually operating a mechanism (not shown) after the magazine 30 is located as shown to cause the drive shafts of the drive mechanism for the reels to be inserted into the openings in the hubs therefor. In a third technique, the magazine 30 may be lowered by means of a suitable manually operated mechanism, a solenoid or motor, when it is so aligned, to cause the hubs 37 and 39 to couple to the ends of the drive shafts for the reels.

Transducing the higher frequency video signals with respect to tape T of the magazine 30 is effected by means of a number of magnetic recording and/or reproduction heads denoted 51, one of which is illustrated as supported by the drum 50 and is located to permit it to scan record on or reproduce from the tape T when the latter is lengthwise drawn against the drum and is drawn lengthwise thereof as the drum 50 rotates causing the head or heads 51 supported by the drum to scan magnetic recording tracks which extend transversely with respect to the tape as it is driven from the supply reel 36 to the take-up reel 38.

Disposing of the Tape T into operative engagement with a longitudinal portion of the surface of the drum 50 extending parallel to the longitudinal axis of the drum whereby it conforms to between ¼ and ⅓ or more of the surface of the drum, is effected by means of a mechanism which includes a pair of idler cylinders or drums 19 and 20 and an assembly 60 including a cylindrically shaped guide 61 which is moved up from below drum 50 after the tape T is disposed immediately adjacent the drum, to cause a portion of the tape to conform to the surface of the drum.

The end wall 34 of the magazine housing is either broken away at the central portion thereof as illustrated in FIGS. 1 and 2, or pivoted out of the way to permit operative engagement with a portion of the free length of tape located between the reels. In FIG. 1, the central portion of the end wall 34 is missing and respective recesses 47 and 48 are molded in the bottom side wall 36 of magazine 30 to permit the magazine to attain the operative position shown while permitting the positioning drums or cylinders 19 and 20 to be disposed behind the tape without interfering with the bottom wall 35 of the magazine.

Figures 3, 4:
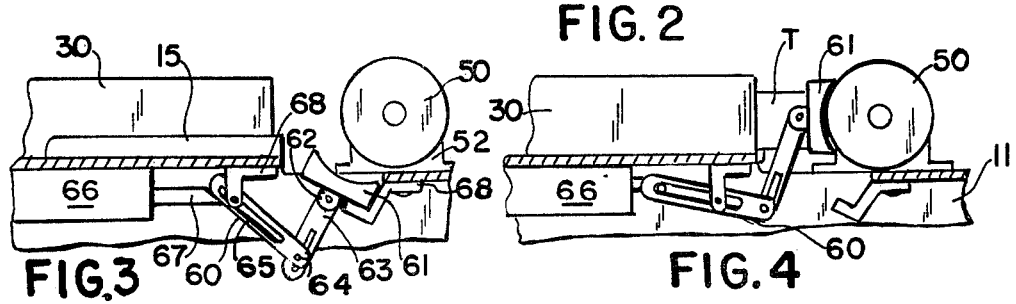
FIG. 3 is a side view with parts broken away and sectioned for clarity of a portion of the apparatus of FIGS. 1 and 2 illustrating the mechanism thereof for compressing and holding magnetic tape against the drum of FIG. 1.
FIG. 4 is a side view with parts broken away and sectioned for clarity of the portion of the apparatus shown in FIG. 3 with the mechanism extended to engage the tape against the drum.

The cylindrical pins or drums 19 and 20 are operated by a mechanism (not shown) to permit them to be either manually driven or power driven by means of a motor or solenoid along respective slotted openings or tracks 17 and 18 formed in the top wall 12, to permit the cylinders or drums 19 and 20 to engage the rear surface of tape T and to draw it out of the magazine 30 to the immediate vicinity of the drum 50, after which the head 61 of assembly 60 is actuated by a solenoid 66 as shown in FIGS. 3 and 4, and is driven from a lowermost storage location (FIG. 3) to an operative location as shown in FIG. 4 against the drum 50 and in so doing, carries the tape T which has been pulled out of the cartridge by the cylinders or pins 19 and 20, against the drum 50, as shown in FIGS. 2 and 4.

The mechanism 60 is shown in FIG. 3 as including tape retaining head 61, which is retracted out of the way of the tape in FIG. 3 to permit the tape to be drawn out of the magazine 30, a pivoted joint 62 supporting head 61 at the end of a first arm 63 having a slotted opening along a major portion of its length, in which opening is disposed the pin 64 of a second arm 65. Arm 65 is pivotally supported at the end of a shaft 67 for a solenoid 66. An elongated slotted opening extending through arm 65 permits a pin at the end of a bracket 62 to ride therein, causing arm 65 to pivot upwardly as the shaft 67 is retracted into the solenoid 66. Pin 64 at the end of arm 65 rides in a slot extending along a major portion of the arm 63 and causes the tape engaging head 61 to be moved upwardly behind the tape and then to engage, conform and compress the tape against the surface of the drum, when in the position shown in FIG. 4, thus operatively locating the tape T for a video recording or a video reproduction operation.

In FIGS. 3 and 4, notation 68 refers to a bracket receptacle for the tape conforming head 61 holding the latter in a position as illustrated in FIG. 3 whereby it is out of the way of the tape of the magazine. After the tape T has been pulled out of the magazine by the movement of the pins or cylinders 19 and 20 along the tracks 17 and 18, mechanism 60 may be operated by energization of the solenoid 66 to pull its arm 67 into the solenoid causing head 61 to move against the rear surface of the tape to carry it against a substantial portion of the cylindrical surface of drum 50 as illustrated in FIG. 4 so the tape conforming to the surface of the drum 50 may be longitudinally driven across from reel 36 to 38 in a manner to permit the magnetic transducing heads 51 to continuously transversely scan the tape as it is driven.

Notation 55 refers to wires extending from a bearing support 54 for the shaft 53 of motor 52 and drum 50. Bearing 54 also contains commutating elements and wires 55 for receiving and transmitting by wire, the information reproduced by the heads 51 as they scan tape T. The wires 55 may extend to suitable amplifying circuits which feed video picture signals generated by the magnetic heads 51 to a television monitor such as the screen of a cathode ray tube and generate such information on the monitor for viewing purposes.

Notation 21 refers to a stationary capstan wheel or drum supported above the wall 12 and operable to have tape T compressed thereagainst by wheel or drum 20 when the latter is moved upwardly along its guide 18 to bring the tape adjacent drum 50. Wheel or cylinder 21 is preferably connected to a motor and when said wheel is power rotated in the counterclockwise direction, it drives the tape T towards the reel 38. The motor driving capstan 21 is therefore preferably a motor of constant speed or is speed controlled by a suitable electronic circuit to cause tape T to be driven along mount or drum 50 for transducing video signals transversely across the tape.

Notations 40, 41, 42, 43, 44 and 45 refer to idler wheels or cylinders supported between the side walls 35 and 36 of the magazine or cartridge 30, for guiding the tape, as illustrated, between the reels 36 and 38 to permit a suitable transducing operation to be performed with respect to the transverse tracks of the tape by the multiple magnetic heads 51 supported by the drum 50.

Also illustrated in FIGS. 1 and 2 is a bank of magnetic reproduction heads 49 which are supported by the top wall 12 and so located so as to operatively engage a border portion of the magnetic tape when it is drawn out of the magazine as shown in FIG. 2 to permit transducing, erasure or recording of signals, such as sound signals or synchronization signals, along the border portion of the tape, which does not interfere with the transverse tape recording described.

An opening 12A is provided in the top wall 12 to permit the mechanism 60, particularly the head 61 thereof, to be projected upwardly from a retracted position, out of the way, as shown in FIG. 3, and to engage a portion of the drum or cylinder 50 supporting the magnetic transducers which transversely scan the major portion of the width of the tape when the head 61 is located as shown in FIG. 4. This occurs when the shaft 67 of the solenoid 66 which operates the linkages to carry the head 61 upwardly and against the drum, is retracted.

At the end of the transducing operation, solenoid 66 is operated to project its shaft 67 to cause the mechanism to assume the approximate attitude illustrated in FIG. 3 whereby head 61 is disengaged from and out of the way of the tape, permitting the tape to be drawn back into the magazine 30 to the position shown in FIG. 1, by properly operating the drive means for either or both of the reels 36 and 38, after cylinders 19 and 20 have been retracted to the positions illustrated in FIG. 1.

Notation 68 refers to a bracket or receptacle supported beneath the top wall 12 of the housing 11 and adapted to retain and hold head 61 in the retracted position shown in FIG. 3. The pivotal joint 62 for the head 61 is therefore preferably spring loaded by a suitable coil spring to cause the head 61, when it is not urged to the location shown in FIG. 4, to assume the position shown in FIG. 3, whereby the linkage element 63 is at substantially a right angle to the rear face of the head 61.

Figure 5:
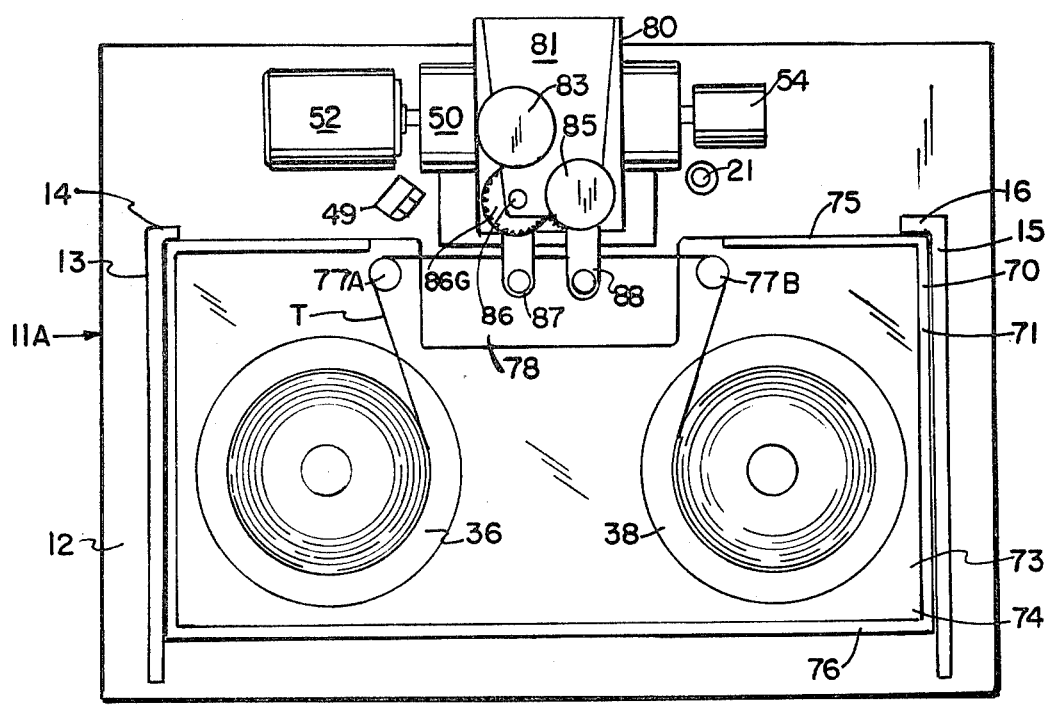
FIG. 5 is a plan view of a modified form of recording apparatus and tape containing magazine.
Figure 6:
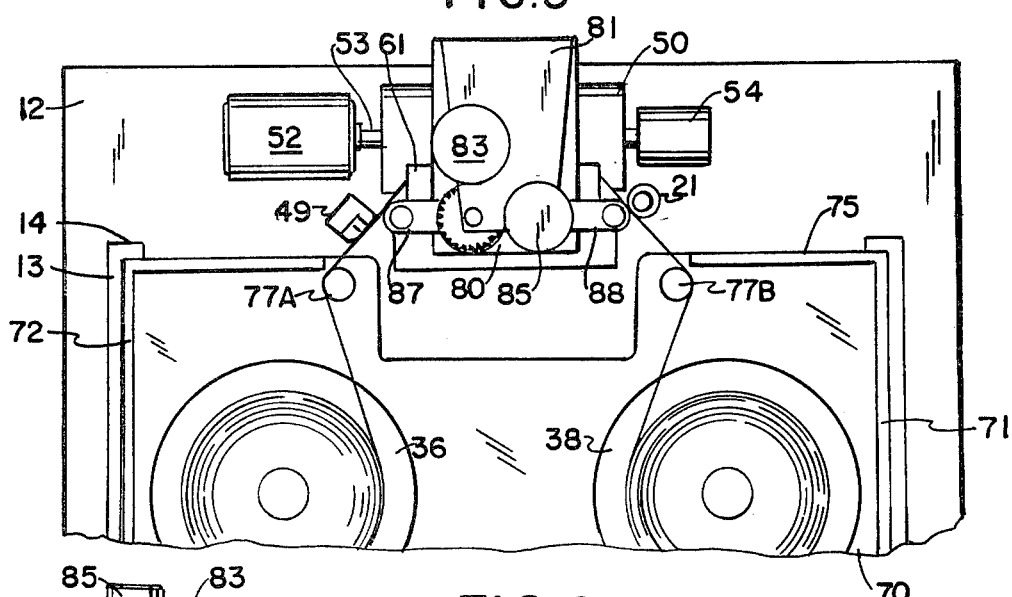
FIG. 6 is a plan view of part of the apparatus of FIG. 5 showing the tape of the magazine drawn out of the magazine.
Figure 7:
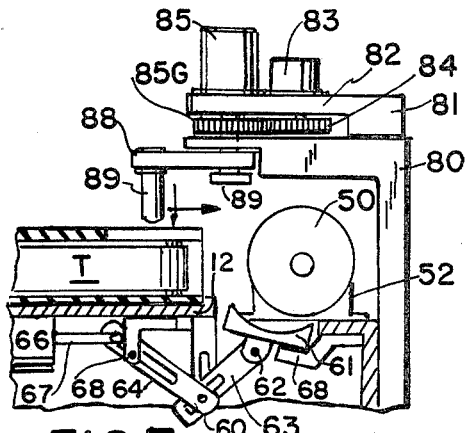
FIG. 7 is a side view with parts broken away and sectioned for clarity of a portion of the apparatus of FIGS. 5 and 6 and the magazine thereof, prior to withdrawing the tape from the magazine.

FIGS. 5–7 illustrate another embodiment of the invention wherein the magnetic tape T of a magazine or cartridge 70 which is a modified form of the cartridge 30 of the embodiment of FIGS. 1–4, extends across an opening in the end wall 75 of the magazine 70, as shown in FIG. 5. Not only is there provided an opening in the end wall 75 at the central portion thereof, but either or both of the major side walls 73 and 74 of the magazine 70 are cut away defining an opening or openings 78 therein into which opening respective pins, denoted 89, supported by pivotable arms 87 and 88, may be extended by the operation of a solenoid 85 supported by a bracket 81 forming part of an L-shaped support 80 for the arms 87 and 88 and means for both projecting the arms 87 and 88 to locate the pins 89 thereof directly behind the tape and pivotally rotating said arms in opposite directions to engage the rear face of the tape and carry it out of the magazine 70 as shown in FIG. 6, to the immediate vicinity of a drum 50 which supports three or four magnetic transducing heads (not shown) as provided in the embodiment illustrated in FIGS. 1–4.

Bracket 81 supports push-pull solenoid 85 which downwardly advances and upwardly retracts the pivoted arms 87 and 88. A rotary solenoid 83 is also supported by bracket 81 and is operable when activated, after the arms 87 and 88 are driven downwardly to dispose the pins 89 thereof directly behind the tape T, to pivotally rotate arms 87 and 88 in opposite directions to attain the positions illustrated in FIG. 6 wherein the tape is drawn out of the cartridge to the vicinity of the drum 50. Rotary solenoid 83 contains a gear 84 on its output shaft which meshes with a gear 86G which supports a pin or shaft 86, at the end of which is secured arm 87. Shaft 86 is connected by a cross linkage 89 to the shaft 85S of the solenoid 85 so that the arms 87 and 88 move up and down together when the solenoid 85 is activated and deactivated or operates to project and retract its shaft. The shaft 86 and the solenoid shaft 85S are preferably splined or keyed to permit them to be longitudinally moved through the hubs of the gears 85G and 86G so that the arms 87 and 88 may be sequentially moved in the vertical direction and pivoted about the axes of the shafts 85S and 86 when the rotary solenoid 83 and the lineal solenoid 85 are sequentially operated as described.

When the arms 87 and 88 assume the positions illustrated in FIG. 6, the solenoid 66 located beneath the top wall 12, may be activated retracting its shaft 67 and causing the mechanism 60 to move the tape engaging head 61 upwardly behind the tape and to cause the tape to be driven thereby in conformance with the cylindrical surface of the drum 50 so that when the drum rotates thereafter as the tape is driven to the take-up reel 38, the transducing heads supported by the drum may transversely scan the tape each time each head comes into engagement with the border of the transverse recording area of the tape and may either record on or reproduce signals with respect to the transverse tracks of the tape as described.

Modified forms of the invention are noted as follows:

I. Mechanisms other than those illustrated in FIGS. 1–7 may be employed to engage and pull the magnetic tape from the magazine or cartridge housing and to make the tape conform to the surface of the drum to permit transducing to be effected by the transducers supported by the drum. For example, the drum pillow blocks or supports 52 may also support either or both the tape manipulation mechanism for pulling the tape out of the magazine housing and the head containing the concave surface for urging the tape, once aligned along the drum, against the surface of the drum to conform thereto. Such mechanism may be pivotally supported for rotation about the rotational axis of the drum 50 or any other axis.

II. The head 61 may be secured within the cartridge or magazine 30 with the concave cylindrical surface thereof located directly behind the tape and fixed in position to support the tape from the rear when the magazine is moved to engage the tape against the drum. In other words the head 61 or its equivalent may form part of or be assembled with the magazine front and/or rear walls adjacent and behind the free length of tape between the supply and take-up reels and in alignment with an opening in the end wall of the magazine housing wherein the housing and its guide is shaped to permit the tape therein to engage the magnetic head containing drum and to be compressed against the concave surface of the head or rear support for the tape in the housing without the need to move the head. The longitudinal or rotational axis of the drum may extend parallel to the end wall of the magazine housing or skewed with respect thereto to permit transverse scanning of the tape as it is driven in the housing past the drum and in conformity with the surface of the drum either circumferentially or longitudinally thereof.

III. The tape guide may comprise a cylindrically shaped tubular formation assembled or molded integral with either or both the top and bottom side walls of the magazine housing and open at the side wall facing the wall of the support or housing against which the magazine is operatively supported. The cylindrical transducer supporting drum may be supported on the recorder housing for rotation about an axis normal to the wall thereof supporting the magazine at a location such that it will enter said tubular formation and rotate ther heads thereof therein. The tape is helically guided at least once around the outside of the tubular formation past an opening therein wherein the wall of the tubular formation is so shaped around the opening to permit the tape, when properly tensioned between the supply and takeup reels, to engage the surface of the drum during its travel around the tubular formation thus permitting the transducer(s) supported by the drum to operatively can the tape along transverse tracks thereof during recording and/or reproduction operations with respect to the tape. The tubular formation is preferably externally shaped with guides for the lateral edges of the tape and auxilliary guides supported with the magazine may also be employed to retain the tape is suitable alignment and conformity with the tubular formation surrounding the drum inserted therein.

IV. A tape support with a concave cylindrical surface may be formed integral with or molded of the plastic orming the front and rear walls 35 and 36 of the cartridge housing 30 behind the tape and the cartridge may be manually moved or motor driven to its operative osition wherein the periperal cylindrical surface of the rum 50 engages the free length of tape T against such oncave cylindrical surface to conform the free length f tape to the surface of the head drum 50 without the eed for pulling the tape out of the cartridge housing, uch position being maintained on the top wall 12 of upport 11 by suitably located spring loaded pins such s locking pins 22 of FIG. 1 or other suitable locking aeans.

I claim:

1. Magnetic transducing apparatus comprising in combination:
   a support,
   a magazine containing magnetic recording tape including supply means for said tape and a take-up reel rotationally supported within said magazine, an opening in said magazine,
   means for supporting and prepositioning said magazine on said support,
   a drum rotationally supported on said support for rotation about its longitudinal axis, transducing means supported by said drum for rotation therewith,
   a motor supported by said support and operatively connected to said drum for rotating said drum at constant speed,
   first tape manipulation means supported by said support and operable to engage a portion of the tape in said magazine and to withdraw a loop formation thereof through said opening and out of said magazine and to dispose said tape between said magazine and said drum with the longitudinal axis of said tape extending parallel to the longitudinal axis of said drum,
   second tape manipulation means, means for moving said second tape manipulation means into engagement with said portion of said tape disposed between said drum and said magazine by said first tape manipulation means to cause said tape to conform to a portion of the length of said drum whereby, when said drum is rotated by said motor, the transducing means supported by said drum will transversely scan said tape,
   tape drive means supported adjacent the portion of said tape drawn from said magazine and operable to drive said tape longitudinally along said drum as said drum rotates and therefrom into said magazine,
   means supported by said support for operating said takeup means to take up the tape driven into said magazine by said tape drive means whereby tape may be constantly driven towards and away from said drum so that the transducing means supported by said drum transversely scans said tape as said tape in driven longitudinally along the surface of said drum.

2. An apparatus in accordance with claim 1 wherein said magazine contains and rotationally supports a supply reel and a takeup reel for said tape and motor means supported by said support, coupling means connected to said motor means and connectable to said takeup reel of said magazine when said magazine is predeterminately located on said support to permit said motor means to drive said takeup reel simultaneously as the tape is driven by said tape drive means to permit the tape to be wound on said takeup reel.

3. An apparatus in accordance with claim 1 wherein said second tape manipulation means is supported below said magazine when said magazine is operatively prepositioned on said support, and power operated means for operating said second tape manipulation means to move upwardly and engage said tape and urge said tape against said drum.

4. An apparatus in accordance with claim 1 wherein said second manipulation means includes a head portion shaped with a concave surface conforming to the surface of said drum and means operable to move said head portion to cause said concave surface to engage the rear face of said tape against said drum and to cause said tape to conform to the surface of said drum.

5. An apparatus in accordance with claim 4 wherein said means, for moving said head portion includes means pivotally supporting said head portion and pivotally moving said head portion from behind and below said tape to engage and urge said tape against said drum.

6. An apparatus in accordance with claim 5 including motor means connected to operate said means for causing said head portion to engage said tape against said drum and for releasing said tape from said drum when transducing operations with respect to said tape are completed.

7. An apparatus in accordance with claim 1 including means for operating said first tape manipulation means to predeterminately remove said tape from said magazine and said second tape manipulation means thereafter to cause said tape to engage said drum to bring said tape into operative relation with said transducing means supported by said drum.

8. A method of transducing signals with respect to a magnetic tape supported in a cartridge comprising:
   prepositioning a cartridge containing magnetic tape on a support which rotationally supports a cylindrical drum supporting magnetic transducing means for rotation about its longitudinal axis for transducing information signals with respect to a magnetic tape disposed against said drum.
   withdrawing a loop of relative movement between said drum and said tape from said cartridge to dispose said tape adjacent the cylindrical surface of the drum with the longitudinal axis of said tape parallel to the longitudinal axis of said drum,
   laterally deforming and causing said tape to longitudinally conform to a portion of the cylindrical surface of said drum to bring the recording surface of the tape into operative engagement with the transducing means of said drum,
   energizing said transducing means while power rotating said drum to cause said transducing means to transversely scan said tape while longitudinally driving said tape past said drum to effect the scanning of a plurality of transverse parallel tracks of said tape along a substantial portion of the length of said tape.

9. A method in accordance with claim 8 wherein the relative movement between said tape and said drum includes removal of a portion of said tape from said cartridge and wherein said tape is laterally deformed by compressing it between said drum and an arcuate surface of a member which is moved into engagement with said tape after the tape is removed from the cartridge.

* * * * *